US006371238B1

(12) United States Patent
Svihla

(10) Patent No.: US 6,371,238 B1
(45) Date of Patent: Apr. 16, 2002

(54) TURBOCHARGER SUPPORT

(75) Inventor: Gary R Svihla, Clarendon Hills, IL (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/568,260

(22) Filed: May 10, 2000

(51) Int. Cl.[7] .............................................. B60K 13/04
(52) U.S. Cl. ...................................... 180/296; 248/637
(58) Field of Search ................................ 180/291, 296; 60/605.1, 598; 123/184.21, 195 A; 248/562, 569, 602, 619, 637, 673, 675

(56) References Cited

U.S. PATENT DOCUMENTS

| | | | | |
|---|---|---|---|---|
| 2,828,939 A | * | 4/1958 | Grey ........................... | 248/675 |
| 3,088,446 A | * | 5/1963 | Fox et al. ................. | 123/195 A |
| 3,935,848 A | * | 2/1976 | Gamell .................... | 123/195 A |
| 4,060,143 A | * | 11/1977 | Matsumoto et al. ......... | 180/296 |
| 4,122,673 A | * | 10/1978 | Leins ........................ | 60/605.1 |
| 4,414,725 A | * | 11/1983 | Breitweiser et al. ....... | 60/605.1 |
| 4,480,440 A | * | 11/1984 | Harper et al. .............. | 60/605.1 |
| 4,559,783 A | * | 12/1985 | Ampferer ................... | 60/605.1 |
| 4,616,482 A | * | 10/1986 | Kronogard et al. ......... | 60/605.1 |
| 4,677,826 A | * | 7/1987 | Iwai et al. .................. | 60/605.1 |
| 4,741,676 A | * | 5/1988 | Janes ...................... | 123/195 A |
| 4,918,917 A | * | 4/1990 | Woods ....................... | 60/605.1 |
| 4,991,412 A | * | 2/1991 | Bauer et al. ................ | 248/562 |
| 5,088,285 A | * | 2/1992 | Stevenson .................. | 60/605.1 |
| 5,224,459 A | * | 7/1993 | Middlebrook ........... | 123/195 A |
| 5,624,099 A | * | 4/1997 | Spies et al. ................. | 248/562 |
| 6,101,995 A | * | 8/2000 | Itoh et al. ............... | 123/195 A |

FOREIGN PATENT DOCUMENTS

| | | | | |
|---|---|---|---|---|
| DD | 260681 | * | 10/1988 | ................. 180/291 |
| JP | 59-11919 | * | 1/1984 | ................. 180/291 |
| JP | 1-12916 | * | 1/1989 | ................. 180/291 |

* cited by examiner

Primary Examiner—Frank Vanaman
(74) Attorney, Agent, or Firm—Cary W. Brooks

(57) ABSTRACT

An exhaust driven turbocharger for a medium speed diesel engine such as for use in a diesel locomotive or other suitable application includes an exhaust duct supported at one end by a rotor support having rigidly connected feet mountable upon a rigid base. The exhaust duct is supported at an axially opposite end by an exhaust duct support that includes laterally spaced support legs extending from individual mounting feet to points connecting with a support portion of the exhaust duct support located vertically above the axis of the rotor. The legs are configured to be essentially rigid in reducing vertical forces so as to solidly support the mass of the turbine end of the exhaust duct with which they are connected, but are made flexible laterally and axially so as to allow both lateral and radial expansion and contraction of the exhaust duct while limiting resulting stresses from the thermal variations in the exhaust duct, the exhaust duct support and the supporting base. Preferably, the locations of connection of the support legs with the exhaust duct support portion are such that vertical expansion of the exhaust housing between the rotor axis and the position of connection of the legs approximately equals linear extension of the legs so that vertical movements of the axis due to thermal changes are approximately equal at opposite ends of the rotor.

10 Claims, 3 Drawing Sheets

TURBOCHARGER SUPPORT

TECHNICAL FIELD

This invention relates to engine exhaust driven turbochargers and more particularly to support means or mounting apparatus for a turbocharger that accommodates thermal expansion and contraction of the exhaust duct or body of the turbine portion of the turbocharger.

BACKGROUND OF THE INVENTION

It is known in the art to provide an engine turbocharger with mounting apparatus or support means for mounting the turbocharger to the engine or another base in a manner that allows thermal expansion and contraction of the exhaust duct or housing of the turbine portion of the turbocharger while minimizing stresses in the turbocharger, mounting apparatus and associated base or support due to the substantial thermal changes. In larger diesel engines, such as locomotive engines where high exhaust temperatures are encountered and the mass of the turbocharger housing or exhaust duct is relatively large, the amount of thermal growth of the exhaust duct or related housing can be significant and involve substantial radial and axial growth of the structure. It is thus desired to accommodate this radial and axial growth in the exhaust duct of an engine turbocharger by providing a relatively simple but effective mounting apparatus which accommodates both radial and axial expansion of the exhaust duct without causing excessive stresses in the exhaust duct, the mounting apparatus or the supporting base.

SUMMARY OF THE INVENTION

The present invention provides a mounting apparatus that comprises a rotor support which carries a major portion of the mass of the turbocharger including the rotor bearings and associated rotor and the air compressor ducting as well as a compressor end of the turbocharger exhaust duct. The rotor support is fixed solidly to a mounting base such as the engine or a component thereof. An axially opposite turbine end of the exhaust duct is secondarily supported by support means including a pair of laterally spaced support legs having feet which are fixed to the base. The legs extend upward on opposite sides of the axis to connect with the exhaust duct, or a duct support, at points above the axis of the rotor and associated ducting. The legs are made essentially rigid in resisting vertical forces, but relatively resilient as to axial and radial forces so as to allow axial and radial expansion and contraction of the turbine end of the exhaust duct relative to the compressor end without introducing high stresses in the exhaust duct, the mounting means or the associated support base. Preferably, the points at which the legs are connected with the exhaust duct support are at selected points above the axis where vertical expansion of the exhaust housing between the axis and the connection with the legs approximately equals linear expansion of the legs. Thus, vertical movements of the axis due to thermal changes will be minimized or will approximately equal the position of the axis at the opposite end of the rotor. In this way, the components are maintained in axial alignment without tilting of the axis or misalignment of the structure due to thermal expansion and contraction conditions.

These and other features and advantages of the invention will be more fully understood from the following description of certain specific embodiments of the invention taken together with the accompanying drawings.

DESCRIPTION OF THE PREFERRED EMBODIMENT

Figure 1:
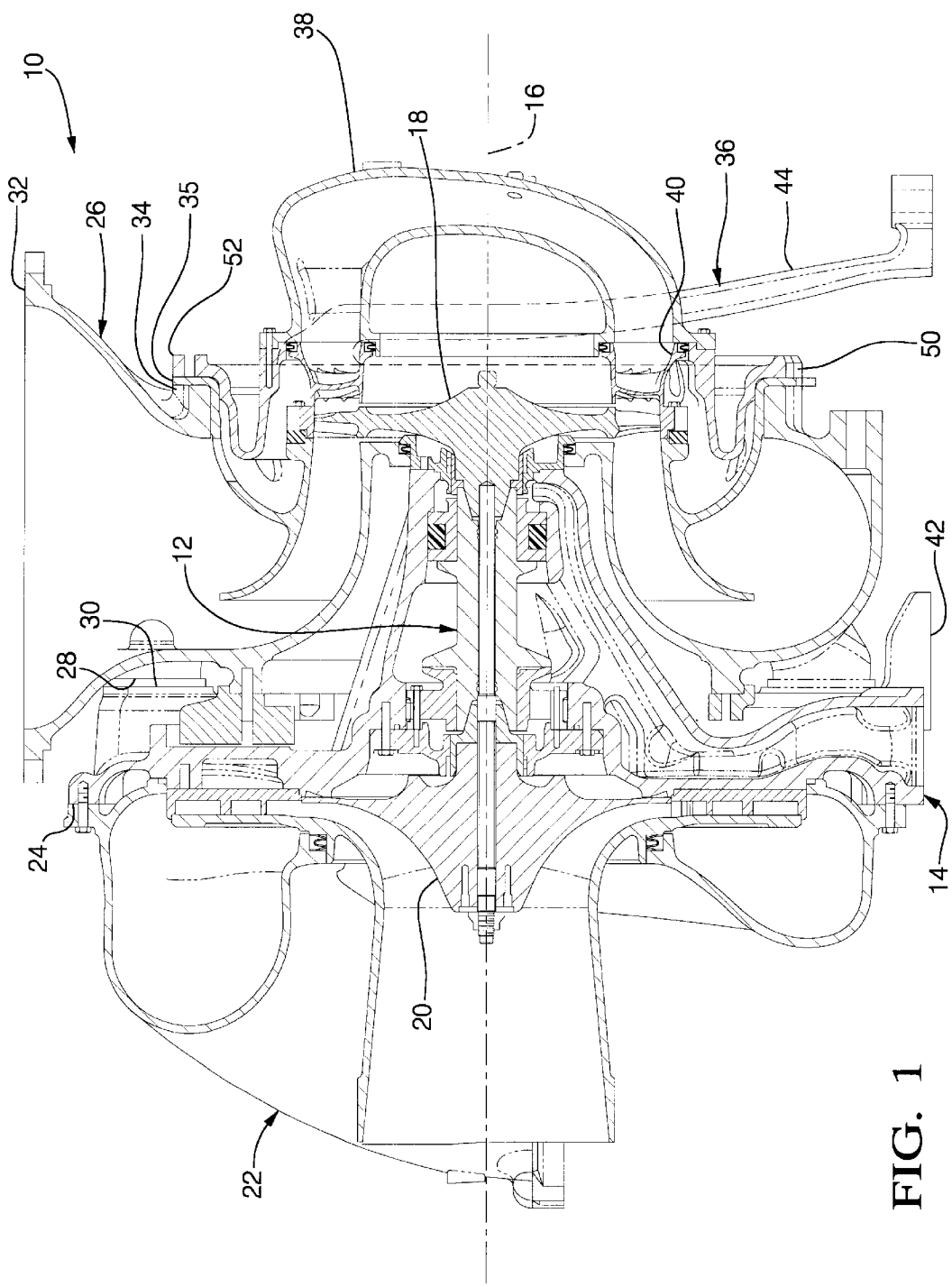
FIG. 1 is a cross-sectional view of an engine turbocharger having mounting apparatus according to the invention.
Figure 2:
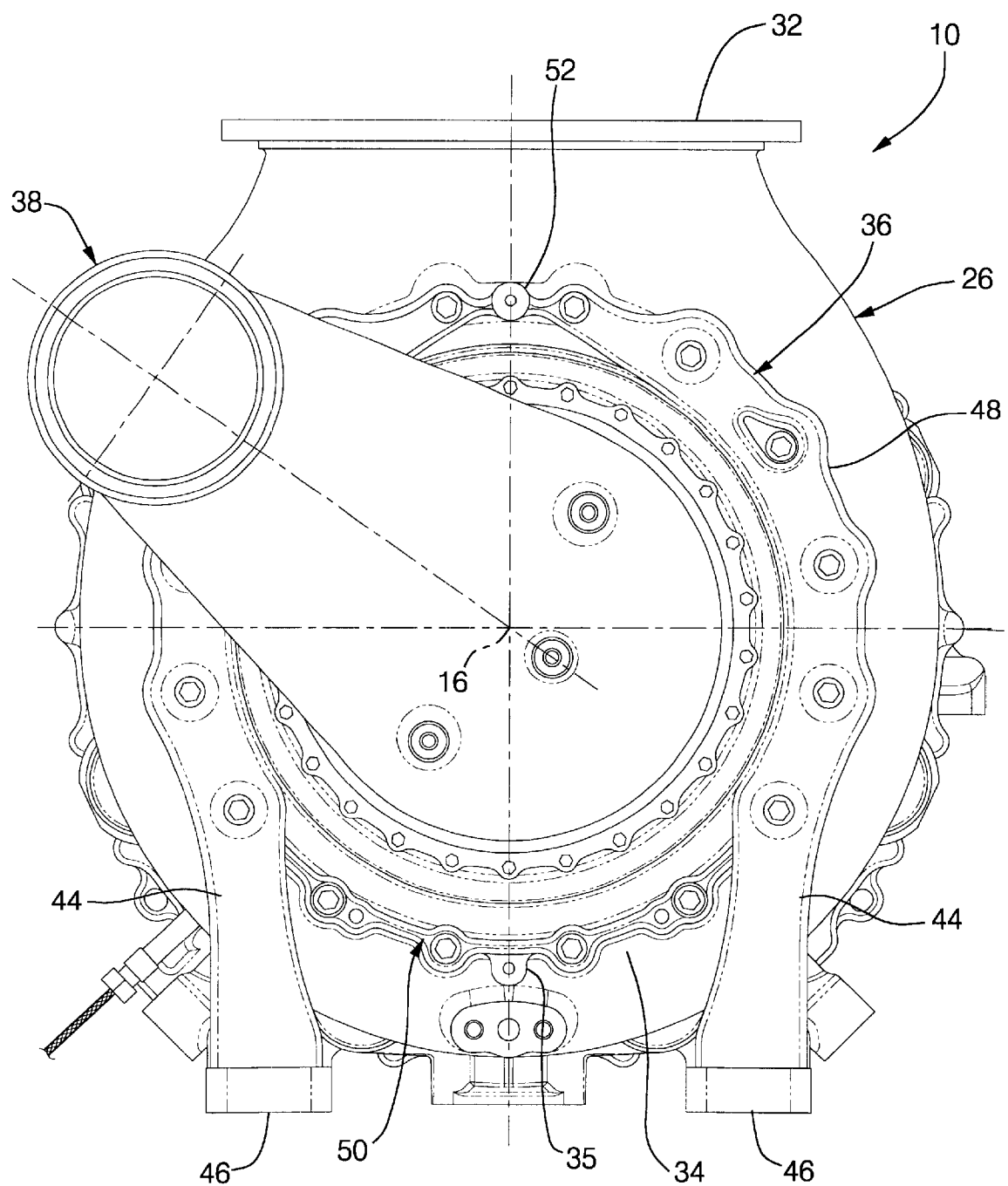
FIG. 2 is a turbine end view of the turbocharger and mounting apparatus of FIG. 1.
Figure 3:
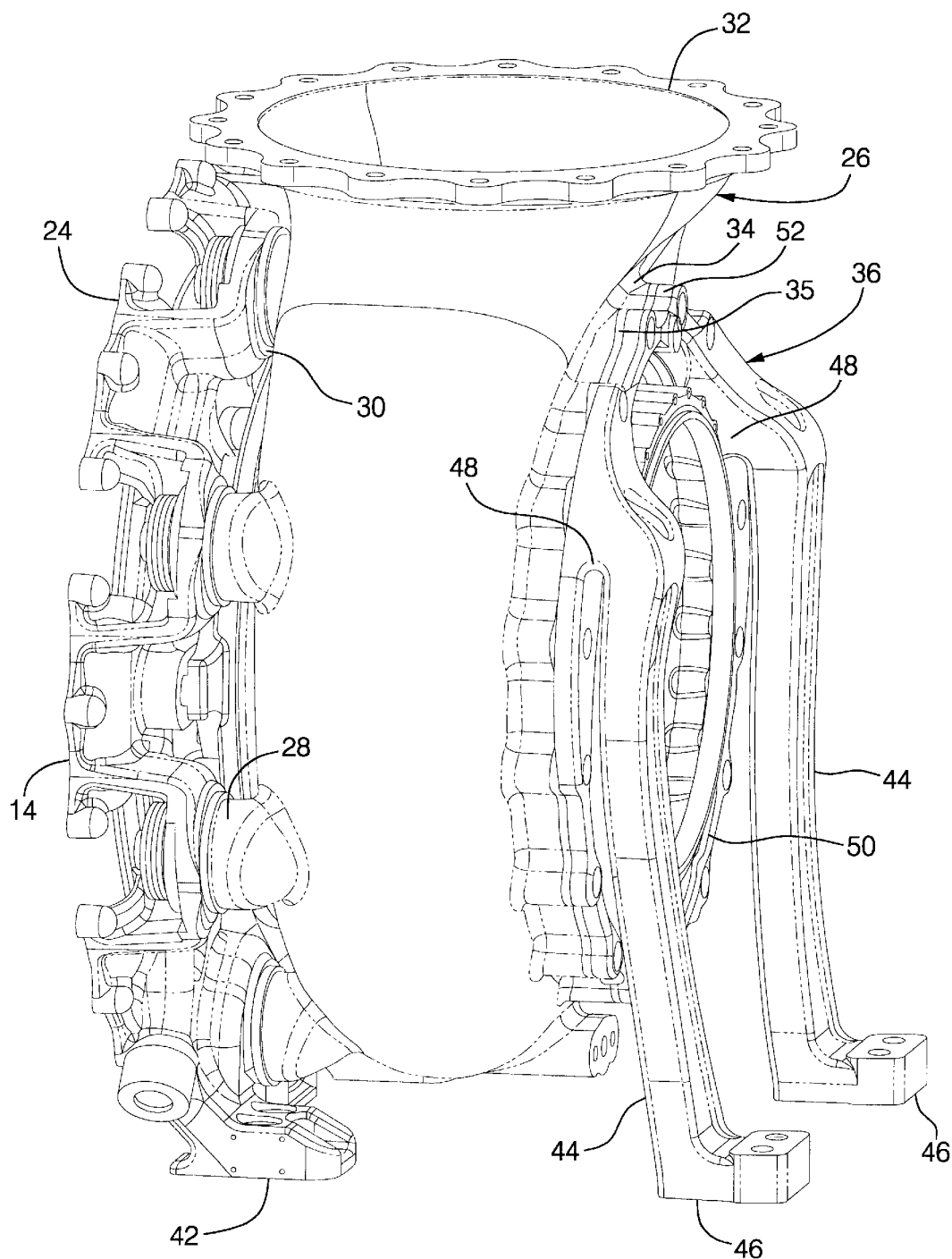
FIG. 3 is a pictorial view illustrating an exhaust duct for the turbocharger of FIGS. 1 and 2, together with the mounting apparatus for supporting both ends of the duct.

Referring now to the drawings in detail, numeral 10 generally indicates an exhaust driven turbocharger for an engine, such as a diesel engine intended for use in railway locomotives or other applications of medium speed diesel engines. Turbocharger 10 includes a rotor 12 carried by a rotor support 14 for rotation on a longitudinal axis 16 and including a turbine wheel 18 and a compressor wheel 20. The compressor wheel is enclosed by a compressor housing assembly 22 including components which are supported on an axially facing first side 24 of the rotor support 14. An exhaust duct 26 has a compressor end 28 that is mounted on a second side 30 of the rotor support 14 that is spaced axially from the first side 24.

The exhaust duct 26 is physically positioned between the rotor support 14 and the turbine wheel 18 to receive exhaust gases passing through the turbine wheel and carry them to an exhaust outlet 32. A turbine end 34 of the exhaust duct 26 and an associated nozzle retainer assembly 35 are separately supported by an exhaust duct support 36 that is connected with the exhaust duct 26 at the turbine end 34. The exhaust duct support 36 also supports a turbine inlet scroll 38 which receives exhaust gas from the associated engine and directs it through a nozzle ring 40 to the turbine wheel 18 for transferring energy to drive the turbocharger compressor wheel 20.

In accordance with the invention, the rotor support 14 includes a pair of laterally spaced mounting feet 42 which are rigidly connected to the rotor support 14 and are adapted to be fixedly mounted on a rigid base, not shown. The exhaust duct 26 is preferably connected with the rotor support 14 by means which minimize the transfer of heat between the exhaust duct 26 and the rotor support 14 and allow radial expansion of the duct 26 relative to the support 14 but maintain an essentially fixed axial position of the compressor end 28 of the exhaust duct relative to the rotor support 14 to which it is mounted. Thus, thermal growth of the exhaust duct in the axial direction must be accommodated primarily by the exhaust duct support 36 mounted at the axially opposite turbine end 34 of the exhaust duct, adjacent the turbine wheel.

To accomplish this, the exhaust duct support 36 is provided with a pair of laterally spaced support legs 44 which extend generally vertically from separate feet 46 at the lower ends of the support legs to points 48 on a generally circular support portion 50 of the exhaust duct support 36. Points 48 are selectively located above the longitudinal axis 16 of the rotor but not higher than the upper edge 52 of the exhaust duct support circular portion 50. The support legs 44 are relatively long with a suitable cross-sectional configuration that provides flexibility of the legs laterally to and axially along the longitudinal axis of the rotor while maintaining the legs essentially rigid in resisting vertical forces. Thus, the legs provide rigid support of the mass of the turbine end of the turbocharger and the exhaust duct, but allow for thermal growth both axially and radially of the exhaust duct 26. Such thermal growth is occasioned by large temperature changes occurring in the exhaust duct under high temperature operating and subsequent non-operating conditions as well as temperature variations during operation.

Preferably, the connection of the support legs 44 with the circular portion 50 of the exhaust duct support 36 is located so that vertical expansion of the circular portion 50 in the area between the axis and the point at which the legs 44 are attached is essentially equal to the total thermal expansion of the legs. In this way, the position of the nozzle ring 40 surrounding the turbine 18 is maintained in alignment with the longitudinal axis 16 of the rotor and stresses tending toward tilting of the rotor axis are substantially reduced or avoided. In addition, the flexible action of the support legs 44, allowing both longitudinal and radial movement of the exhaust duct and components supported thereby, provides for rigid support of the turbine end 34 of the exhaust duct 26 while at the same time avoiding any substantial build-up of stresses in the exhaust duct and other associated components due to the thermal expansion and contraction inherent in operation of the exhaust driven turbocharger 10.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. Mounting apparatus for an engine exhaust driven turbocharger having a rotor rotatable on an axis and an exhaust duct having opposite first and second axially spaced ends and including an axial opening aligned with the rotor, said apparatus comprising:

first support means connected with said first end of the exhaust duct;

second support means connected with said second end of the exhaust duct;

the first support means having first mounting means rigidly fixed thereto and adapted for mounting on a rigid base;

the second support means including a pair of support legs extending from above the axis downward on opposite sides of the axis to second mounting means adapted for mounting on said base, said legs being essentially rigid in resisting vertical forces but relatively resilient as to axial and radial forces;

whereby the second support means is adapted to carry a portion of the mass of the turbocharger when mounted on a base and is resiliently yieldable axially and radially to accommodate thermal expansion and contraction of the exhaust duct.

2. Mounting apparatus as in claim 1 wherein the first mounting means includes two laterally spaced feet for mounting to a base.

3. Mounting apparatus as in claim 1 wherein said second mounting means include a separate foot on each leg for individual connection of the legs to a base at laterally spaced locations.

4. Mounting apparatus as in claim 1 wherein said support legs extend upward from below the exhaust duct to join an exhaust duct connecting portion of the second support means at points above the axis, the legs having a long length with a relatively small cross section that impedes heat flow therethrough from the connecting portion to the second mounting means.

5. Mounting apparatus as in claim 1 wherein said support legs are connected to the second support means at selected points above the axis where vertical expansion of the second support means between the legs and the axis approximately equals linear extension of the legs so that vertical movements of the axis due to thermal changes are approximately equal at opposite ends of the rotor.

6. Mounting apparatus for an engine exhaust driven turbocharger having a rotor rotatable on an axis and an exhaust duct having opposite first and second axially spaced ends and including an axial opening aligned with the rotor, said apparatus comprising:

a rotor support connected with said first end of the exhaust duct;

an exhaust duct support connected with said second end of the exhaust duct;

the rotor support having at least one foot rigidly fixed thereto and adapted for mounting on a rigid base; and the exhaust duct support including a pair of support legs extending from above the axis downward on opposite sides of the axis to separate feet adapted for mounting on said base, said legs being essentially rigid in resisting vertical forces but relatively resilient as to axial and radial forces;

whereby the exhaust duct support is adapted to carry a portion of the mass of the turbocharger when mounted on a base and is resiliently yieldable axially and radially to accommodate thermal expansion and contraction of the exhaust duct.

7. Mounting apparatus as in claim 6 wherein:

the rotor support includes bearings on which the rotor is supported, the rotor including a compressor wheel and a turbine wheel at opposite ends of the rotor, and compressor air inlet and outlet means supported by the rotor support at the compressor end of the rotor, the rotor support also providing primary support for the first end of the exhaust duct; and the exhaust duct support primarily supporting the second end of the exhaust duct and a connected turbine inlet scroll.

8. Mounting apparatus as in claim 6 wherein the rotor support includes two laterally spaced feet for mounting to a bases.

9. Mounting apparatus as in claim 6 wherein said support legs extend upward from below the exhaust duct to join an exhaust duct connecting portion of the exhaust duct support at points above the axis, the legs having a long length with a relatively small cross section that impedes heat flow therethrough from the connecting portion to the feet.

10. Mounting apparatus as in claim 9 wherein said support legs are connected to the exhaust duct connecting portion at selected points above the axis where vertical expansion of the connecting portion between the legs and the axis approximately equals linear extension of the legs so that vertical movements of the axis due to thermal changes are approximately equal at opposite ends of the rotor.

* * * * *